No. 721,031. PATENTED FEB. 17, 1903.
H. EDELINE.
STORAGE BRAKE FOR VEHICLES.
APPLICATION FILED OCT. 28, 1902.
NO MODEL. 3 SHEETS—SHEET 1.

WITNESSES:
G. W. Wright
P. C. Connor

INVENTOR
HENRI EDELINE
BY
Howson and Howson
HIS ATTORNEYS.

No. 721,031. PATENTED FEB. 17, 1903.
H. EDELINE.
STORAGE BRAKE FOR VEHICLES.
APPLICATION FILED OCT. 28, 1902.
NO MODEL. 3 SHEETS—SHEET 2.

WITNESSES:
F. W. Wright.
A. C. Connor.

INVENTOR
HENRI EDELINE
BY Howson and Howson
HIS ATTORNEYS

No. 721,031. PATENTED FEB. 17, 1903.
H. EDELINE.
STORAGE BRAKE FOR VEHICLES.
APPLICATION FILED OCT. 28, 1902.
NO MODEL. 3 SHEETS—SHEET 3.

WITNESSES:
G. W. Wright.
A. C. Connor.

INVENTOR
HENRI EDELINE
BY
Howson and Howson
HIS ATTORNEYS.

UNITED STATES PATENT OFFICE.

HENRI EDELINE, OF PARIS, FRANCE.

STORAGE-BRAKE FOR VEHICLES.

SPECIFICATION forming part of Letters Patent No. 721,031, dated February 17, 1903.

Application filed October 28, 1902. Serial No. 129,119. (No model.)

*To all whom it may concern:*

Be it known that I, HENRI EDELINE, builder, a citizen of the Republic of France, residing at 33 Rue du Repos, Paris, France, have invented a certain new and useful Storage-Brake for Vehicles, of which the following is a full, clear, and exact description, and for which I have applied for Letters Patent in France, dated July 9, 1902; in Germany, dated July 25, 1902; in Russia, dated July 31, 1902; in Hungary, dated August 22, 1902, and in Austria, dated August 25, 1902.

This invention relates to a storage-brake applicable to vehicles of all kinds, especially to vehicles drawn by animal power, this brake restoring at the restarting the energy stored up during stopping, and thus avoiding in the case of the application to horse-drawn vehicles an excessive strain on the horse or the necessity for the addition of a second horse.

Figure 1:
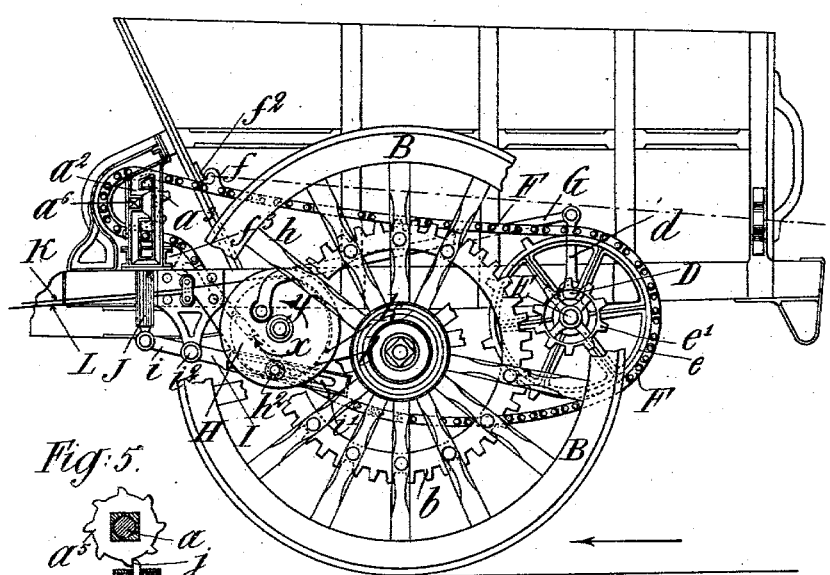
Figure 5:
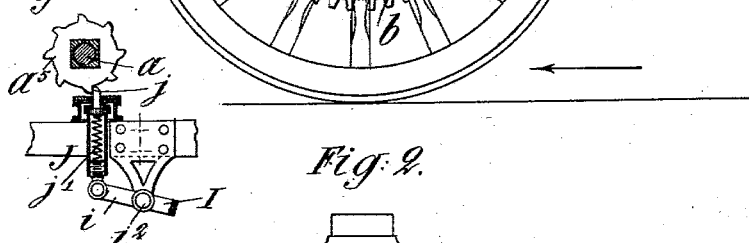
Figure 2:
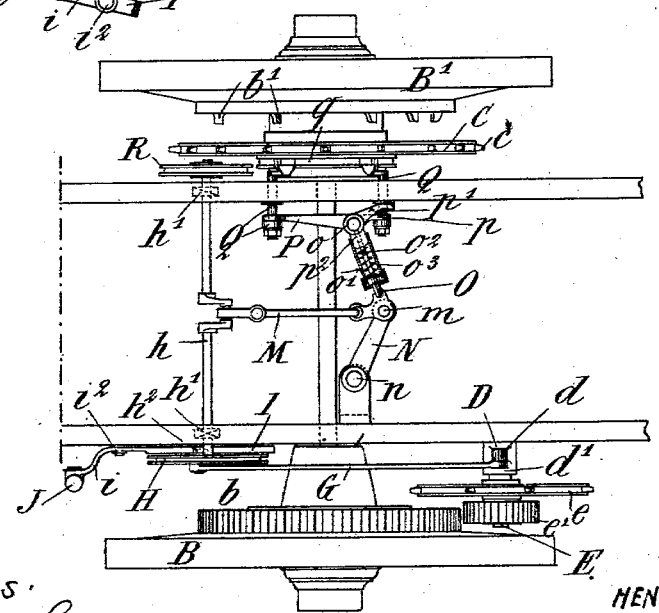
Figure 3:
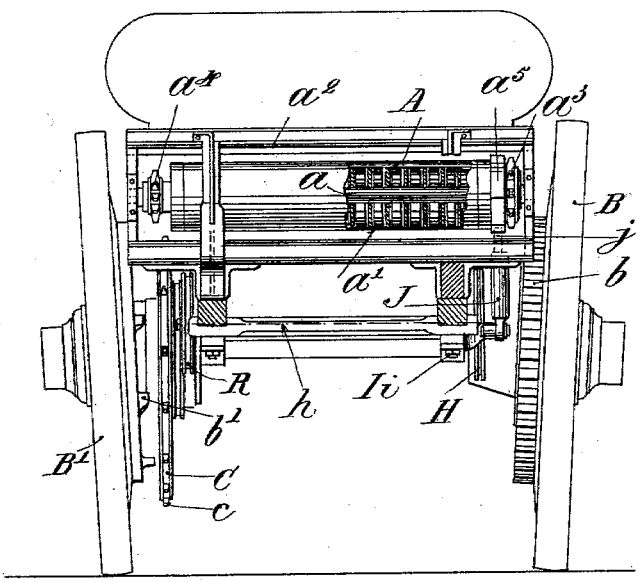
Figure 4:
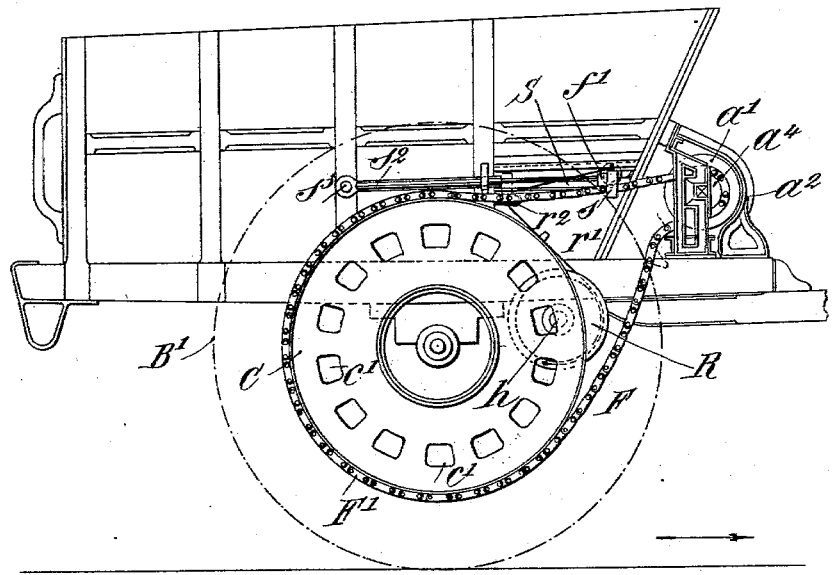

In the drawings annexed, which represent a tilt-cart furnished with the improved apparatus, Figure 1 is an elevation of the cart in its normal working condition. Fig. 2 is a plan showing the working parts under the floor of the cart. Fig. 3 is a front view. Fig. 4 is an elevation from the side opposite to that shown in Fig. 1. Figs. 5 to 11 are detail views.

The apparatus comprises, essentially, a group of springs the winding up of which constitutes the braking force, the energy given out for braking being thus stored up by these springs instead of being lost in rubbing against the shoes, skids, &c., and capable of being exerted at any moment upon the wheels of the vehicle.

The outer ends of the storage-springs A are secured on the cover or casing and the other ends (that is, the centers) on a shaft $a$, arranged across the front of the cart, the whole being inclosed by the cover or casing $a'$, which constitutes a cylinder turning around the shaft and mounted on a frame $a^2$, having nitches $a^6$, which carry and retain the shaft $a$. At one extremity of the cover is fixed a sprocket-wheel $a^4$ and at the other end a sprocket-wheel $a^3$, which I term "spring-sprockets," in contradistinction to the sprockets, as hereinafter described, connected one with the driving-wheel and one with the winding-wheel. To prevent the unwinding of the spring, I also provide, so as to turn with the spring-sprockets, a ratchet-wheel $a^5$. One of the wheels, B, of the vehicle carries a gear-wheel $b$. The other wheel, B', is furnished with a convenient number of engaging teeth $b'$. On the axletree on the side of the wheel B' is mounted a sprocket-disk C, provided with chain-teeth $c$ on its periphery, having a number of perforations $c'$, in which the teeth $b'$ can engage. This disk is capable of a side movement parallel to the axle, so that the openings $c'$ can engage with or disengage from the teeth $b'$ of the wheel B'.

Figure 6:
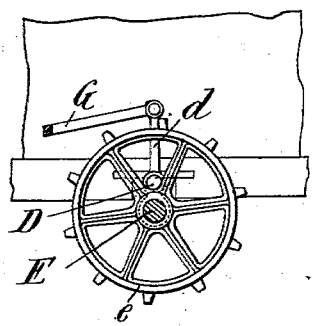
Figure 7:
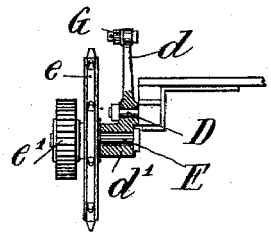
Figure 8:
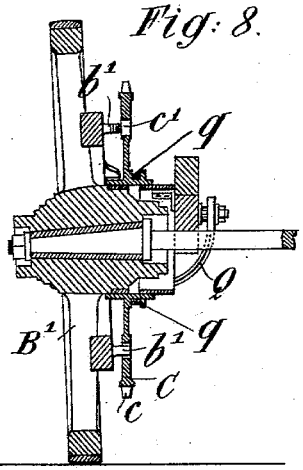
Figure 9:
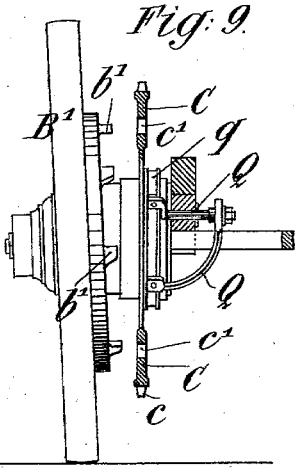
Figure 10:
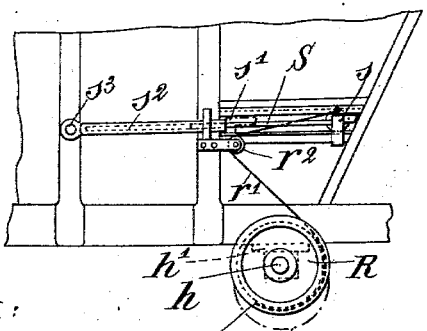
Figure 11:
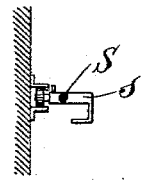

On the frame of the vehicle on the side of the wheel B is a pivot D, on which is pivoted a lever $d\ d'$, Figs. 6 and 7. The lower arm of this lever carries a spindle E, on which are secured a chain or sprocket wheel $e$ and a toothed pinion $e'$, arranged in the plane of the toothed crown $b$. Chains F F' connect the pinion $a^3$ to the chain-wheel $e$ and the pinion $a^4$ to the chain-wheel C.

To the arm $d$ of the lever $d\ d'$ is attached a rod G, joined to a disk H, keyed to a crank-shaft $h$, crossing the vehicle and pivoted in the bearings $h'$. This disk H carries a roller crank-pin $h^2$, on which is engaged one end $i'$ of the rocking bar I, pivoted at $i^2$, and which is jointed at the extremity of its arm $i$ to a rod J, forming a detent which can engage with the ratchet-wheel $a^5$. This detent J may be formed of a tube jointed to the end $i$ of the lever I. At the other end of the tube is mounted a finger $j$, forming the detent proper, actuated by a spring $j'$, Fig. 5. At points $k\ l$ of the disk H are attached two chains or cords K L, which are arranged along one of the shafts and within reach of the driver.

To the crank of the shaft $h$ is fastened a rod M, mounted at the other end on a pivot $m$, which forms the junction of two levers N O, of which one, N, is pivoted at a fixed point $n$ and the other is jointed at $o$ to a three-armed lever P $p\ p'$. The lever O is of variable length. It is for this purpose preferably formed of a tube $o'$, being guided on a hollow projection $p^2$, solid with the lever P $p\ p'$, and the part O, carrying a rod $o^2$, which slides in the projection $p^2$. A spring $o^3$, arranged within the tube $o'$, bears against the projection $p^2$ and a collar formed upon the rod O. To the arms P $p$ of the lever P $p\ p'$ are fixed rods Q Q', which connect the disk C with the said lever P, these rods being connected to the said disk C by the intermediation of the collar $q$. The crank-shaft $h$ carries at its end on this side a pulley R, at a point $r$ of which is fixed a cord or chain $r'$, passing over a jockey-pulley $r^2$ and attached to the head $s$ of a rod S, guided in a slide $s'$ and in a tube $s^2$, mounted on a pivot $s^3$, Figs. 4, 10, and 11.

The chain F carries a catch $f$, and the chain F' carries a catch $f'$. The catch $f$ limits the travel of the chain F between two abutments $f^2 f^3$, and consequently limits the rotation of the cylinder $a'$, carrying the springs. The catch $f'$ of the chain F' is arranged to come into contact with the head $s$ of the rod S.

The working of this is as follows: Forward starting, which is more often used, can be effected as well when the cart is in the normal position as when it is turned over or tilted. In the normal working state the working parts are in the position represented by Figs. 1, 2, 3, and 4. When the driver wishes to stop by putting on the brake, he exerts a pull on the cord L, which makes the disk H turn in the direction $x$. This by the rod G makes the lever $d$ pivot on the axis D, drawing the pinion $e'$ into gear with the toothed crown of the wheel B. This wheel then turns the pinion $e'$ and the toothed wheel $e$, which is secured on the same shaft, and this latter draws the chain F, which thus puts in motion the pinion $a^3$, and with it the cylinder, thus winding up the springs A. The duration of the motion necessary to the winding up of the springs A is determined by the travel of the catch $f$ of the chain F between the stops $f^2 f^3$. While the rotation of the disk H has caused the pinion $e'$ to engage with the toothed crown $b$, the roller $h^2$, engaged in the slide $i'$ of the lever I $i$, has turned this on the axis $i^2$ and disengaged the catch from the ratchet-wheel $a^5$. When the winding of the springs is effected and the chain has made its complete travel, the catch $f$ has come against $f^3$. The system is then locked and the wheel B of the cart skids. At this instant the driver exerts a pull on the cord K, (until the meeting in his hand of the cords K L,) which turns the disk H in the direction $y$ and brings it back to its first position. This disengages the pinion $e'$ from the crown $b$ and brings back the detent J into gear with the ratchet $a^5$. The moving parts are then in the same state as before, except that the springs are wound up and form a reserve of energy representing the force given out in braking—a store which can be used at any moment. It is evident that the driver must exert the pull on the cord K when stopping his cart, for otherwise as soon as the horses had stopped the springs unwinding would pull the cart back. This action, moreover, is used in the case when it is desired to start backward. To make a forward start by using the force which has been stored up since the braking, the driver pulls down the cord K, thus turning the disk H in the direction $y$. The crank-shaft $h$ being fast to the disk H draws the rod M, which acts upon the jointed group of levers N and O. This brings the disk C into gear with the wheel B', and the teeth $b'$ of the latter engage in the openings $c'$ of this disk, Figs. 2, 3, and 9. At the same time the disk H, working the lever I, has made the detent J release the ratchet $a^5$ and the springs can then unwind, restoring the energy which they have accumulated. The pinions $a^3$ and $a^4$ draw the two chains F F'. The chain F merely turns the wheel $e$ and the pinion $e'$, which latter is not in gear with the toothed hub $b$ of the wheel B. The chain F' draws the wheel B', since the latter is fast to the disk C, and the cart is thus put into motion while the energy stored in the springs is being given out. When the springs have given out all their force, the disk C must be disengaged from the wheel B', for if these parts remained fast for even a short space of time after the motive force was expended the apparatus would cause an injurious resistance and risk warping the springs, which would be turned the wrong way. In order to avoid this inconvenience, the automatic disengagement, Figs. 4, 10, 11, comes into play. At the end of the rotation determined by the springs A the catch $f'$ on the chain F' (which at first was in the position shown in Fig. 4) comes into action against the head $s$ of the rod S. This head $s$ had been since the braking brought to the position $s'$ (shown dotted in Fig. 10) by the chain $r$, attached to the pulley R, secured to the shaft $h$. By its displacement of $s'$ to $s$ the head $s$ draws the chain $r'$ and turns the disk R, which by means of the crank-shaft $h$, the rod M, and the levers N and O disengages the disk C from the wheel B'. (See Fig. 2.) All the parts are then in the position in which they are seen in Figs. 1, 2, 3, and 4, the springs being unwound. This mechanism can equally well be used to start the cart when it is tilted. The working is exactly the same. Moreover, should the cart become stuck in mud or otherwise impeded and the energy of the springs has already been expended these can be wound up afresh, so as to obtain a new effort to release the cart. For this purpose the horse or one of the horses may be unharnessed and taken to the rear of the cart and harnessed to a chain or rope fastened to the catch $f$ of the chain F. The latter is thus moved directly and the springs are wound up, the ratchet $a^5$ being free to turn because of the yield of the spring of the detent J. When the chain has traveled so far that the catch $f$ has come onto the chain-wheel $e$, it can be drawn no farther, and the springs are only half wound up. The drawing-chain is then hooked to one of the links of the chain F until the springs are completely wound up. Moreover, if there should not be sufficient room behind the drawing-chain may be hooked to a point in the lower portion of the chain F and the winding effected from the front. The springs can thus be completely wound up without moving the cart, and this force can be used for starting.

I reserve the right to introduce into the mechanism of the storage-brake just described all variations and modifications in construction compatible with the essential conditions laid down.

It is evident that the number of springs is variable according to the desired effect in starting and stopping and that two or more boxes of springs can be placed parallel, connected by gear-wheels.

Such a storage-brake can be applied to all kinds of vehicles with animal or mechanical traction or to railway-carriages.

Having thus described my invention, what I claim as such, and desire to secure by Letters Patent, is—

1. A storage-brake for vehicles, comprising essentially a group of springs mounted on a shaft and on a cylinder which is furnished with two pinions of which one is coupled by a driving-chain to an axle having a pinion which can be brought into gear with a toothed crown attached to one of the wheels of the vehicle, the second pinion of the cylinder being coupled by a chain to a disk mounted parallel to the other wheel and capable of being engaged with it, so that for braking the pinion aforesaid is put into gear with the toothed crown, which turns the spring-cylinder and that for restoring at starting, this pinion being disengaged from the wheel, the clutch-disk is engaged with the other wheel, the spring-cylinder being capable of being fastened or freed by a detent whose play depends on the mechanism aforesaid, substantially as described.

2. A storage-brake, comprising springs A mounted on a shaft $a$ and the other ends fastened to a cylinder which is connected by pinions and chains on one side to a pinion $e$ joined to an oscillating lever $d\ d'$ and capable of being engaged with a toothed crown $b$ of the wheel B, and on the other side to a disk C parallel to the wheel B' and capable of being displaced so as to be connected with it, this taking place upon the movement of levers P $p\ p'$ and of a system of toggle-levers N, O, connected to a rod M, joined to a crank-shaft $h$, which carries a disk H to which are connected a rod G which determines the displacement of the lever $e$ and a lever acting on a detent J in gear with a ratchet $a^5$ of the shaft $a$, the said disk H carrying two cords by the pulling of one or other of which it can be made to take up the position necessary for the braking or starting of the vehicle, as described in connection with the annexed drawings.

3. In a storage-brake, an arrangement to insure the automatic disengagement of the disk C from the wheel B' when the springs have given up the whole of their energy, comprising a pulley R fast to the crank-shaft $h$, to which is attached a cord fastened at the other end to a sliding head $s$ on which acts a catch upon the chain F', as above described with reference to the annexed drawings.

4. A storage-brake for vehicles, comprising a spring secured to the vehicle at one end and secured to two sprocket-wheels at the other end, and adapted to be wound up by the revolution of one sprocket, a gear-wheel secured to one of the vehicle-wheels, a pinion and sprocket adapted to be rotated by said gear-wheel, a chain from said pinion to one of the spring-sprockets and a sprocket-disk connected to the other spring-sprocket and means for moving said disk into engagement with a vehicle-wheel, substantially as described.

5. A storage-brake for a vehicle, comprising a spring, two sprockets therefor, a pinion and a sprocket-wheel adapted to rotate together but pivotally mounted on the vehicle, a gear-wheel secured to a vehicle-wheel, with which said pivoted pinion may engage, and a chain from a spring-sprocket to the pivoted sprocket, teeth on a second vehicle-wheel, a sprocket-disk transversely movable and adapted to engage and rotate with said vehicle-wheel, a chain from said sprocket-disk to the second spring-sprocket, means for meshing the pinion with the gear-wheel, and means for moving the sprocket-disk transversely, substantially as described.

6. A storage-brake for a vehicle having a spring and sprockets therefor, a vehicle-wheel adapted to be connected with one sprocket to wind up the spring, a sprocket-disk adapted to be rotated by the wound-up spring to rotate another vehicle-wheel and stops to prevent the excessive winding of the spring, substantially as described.

7. A storage-brake for a vehicle having a spring and sprockets therefor, a vehicle-wheel adapted to be connected with one sprocket to wind up the spring, a sprocket-disk adapted to be rotated by the wound-up spring to rotate another vehicle-wheel, hand-controlled means to throw the winding-up gears into action and cause the winding-wheel to skid, hand-controlled means to release the skidding wheel and a ratchet to hold said spring wound up, substantially as described.

8. A storage-brake for a vehicle, having a spring and sprockets therefor, a vehicle-wheel adapted to be connected with one sprocket to wind up the spring, a sprocket-disk adapted to be rotated by the wound-up spring to rotate another vehicle-wheel, and automatic means adapted to throw the vehicle driving-sprocket out of gear when the spring has been sufficiently unwound, substantially as described.

9. A storage-brake for a vehicle, having a spring and sprockets therefor, a vehicle-wheel adapted to be connected with one sprocket to wind up the spring, a sprocket-disk adapted to be rotated by the wound-up spring to rotate another vehicle-wheel, a ratchet to hold said spring wound up, means to connect the wound-up spring and the vehicle driving-disk with a vehicle-wheel and means for releasing said ratchet to permit the spring to act on said wheel, substantially as described.

10. A storage-brake for vehicles, comprising a driving-wheel, and a winding-wheel, a transversely-movable sprocket-disk adapted to clutch the driving-wheel, a pivoted gear and sprocket wheel adapted to be engaged at times with the winding-wheel, a spring, two sprockets therefor, a chain from the pivoted sprocket to one spring-sprocket, and a chain from the disk to the other sprocket, stops on both chains, and a controlling-disk and crank-shaft therefor, a lever connected to said shaft adapted to move the sprocket-disk transversely, a ratchet for the spring-sprockets, a lever controlling said ratchet and operatively connected with the controlling-disk, rods from said controlling-disk, adapted to operate the pivoted sprocket and gear, and a disk mounted on said shaft adapted when the springs have been sufficiently unwound to automatically release the transversely-movable sprocket-disk, substantially as described.

In testimony whereof I have signed my name to this specification in the presence of two subscribing witnesses.

HENRI EDELINE.

Witnesses:
GUSTAVE DUMONT,
EDWARD P. MACLEAN.